United States Patent [19]

Chaitin et al.

[11] Patent Number: 4,791,558
[45] Date of Patent: Dec. 13, 1988

[54] SYSTEM AND METHOD FOR GENERATING AN OBJECT MODULE IN A FIRST FORMAT AND THEN CONVERTING THE FIRST FORMAT INTO A FORMAT WHICH IS LOADABLE INTO A SELECTED COMPUTER

[75] Inventors: Gregory J. Chaitin, Yorktown Heights, N.Y.; Clifford H. Hoagland, Round Rock; Marc J. Stephenson, Cedar Park, both of Tex.

[73] Assignee: International Business Machines Corporation, Armonk, N.Y.

[21] Appl. No.: 14,412

[22] Filed: Feb. 13, 1987

[51] Int. Cl.$^4$ .............................................. G06F 9/44
[52] U.S. Cl. ..................................... 364/200; 364/300
[58] Field of Search ...................... 364/200, 300, 900

[56] References Cited

U.S. PATENT DOCUMENTS 4,536,840  8/1985  Borta .................................. 364/300

OTHER PUBLICATIONS

Chapter 4 of "IBM RT PC Advanced Interactive Executive Operating System AIX Operating System Technical Reference Manual", 1st Edition, 11/85 by IBM Corp.
"IBM Journal of Research and Development", vol. 27, No. 3, May 1983, pp. 237 through 246.
"Virtual Resource Manager Technical Reference for the IBM RT PC", 1st Edition (Nov. 1985), Appendix B.
IBM Technical Disclosure Bulletin, vol. 29, No. 2, Jul. 1986, pp. 880–881, "Method to Convert UNIX A.OUT File for Use by a Virtual Resource Manager", to Neal et al.
"An Overview of the PL.8 Compiler", by M. Auslander and M. Hopkins, pp. 22–31.

Primary Examiner—Raulfe B. Zache
Attorney, Agent, or Firm—J. B. Kraft

[57] ABSTRACT

A system for generating program object modules or decks of object code for selected computing systems is provided. The object module is generated from a conventional source program. The system has a compiler for generating an object module from the source program which module has the necessary instructions for executing the desired program in the selected computing system but these instructions are arranged in a first format which is not loadable or readable into the selected computing system. The present system has a converter for converting this first instruction format into a second instruction format which is loadable into the selected computing system. The present system is particularly advantageous when the instructions in the first format are arranged in an order unrelated to the function of the instructions in the object module while the instructions in the second or converted format are arranged in a plurality of sections, each of the sections containing instructions performing a related function in the program of the object module.

12 Claims, 3 Drawing Sheets

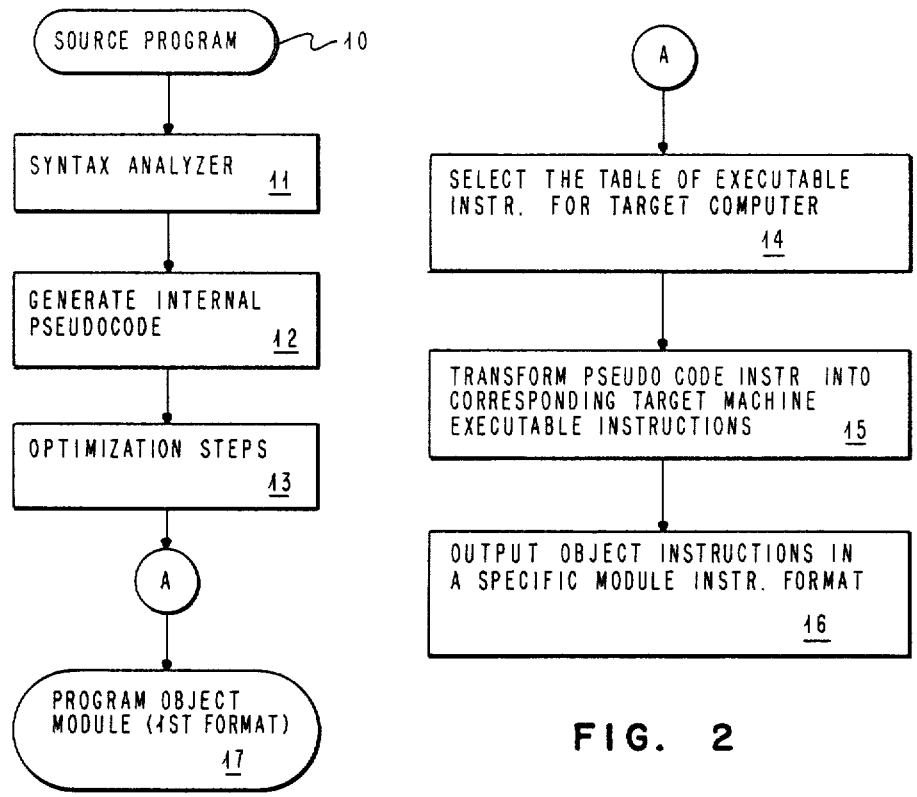
FIG. 1
FIG. 2
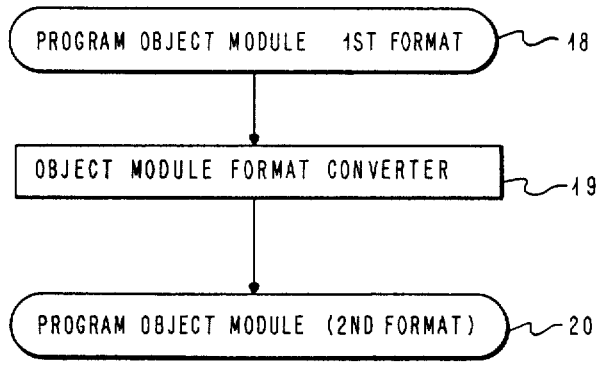
FIG. 3

SYSTEM AND METHOD FOR GENERATING AN OBJECT MODULE IN A FIRST FORMAT AND THEN CONVERTING THE FIRST FORMAT INTO A FORMAT WHICH IS LOADABLE INTO A SELECTED COMPUTER

DESCRIPTION

1. Technical Field

This invention relates to systems for generating computer programs, and is particularly directed to systems for generating program object modules, i.e., program and object code for selected computing systems.

2. Background Art

Over the past several years, there has been a very rapid expansion in numbers and variety of computers in general usage. This expansion has been partcularly rapid in the number and variety of personal computers of increasing scope and computing power. Along with this rapid expansion, has of course come an ever increasing demand for programs generated to run on this wide variety of computers.

Conventionally, when a new computer is developed and enters the marketplace, in addition to a relatively few programs which are originally developed for a new computer, there is a demand for making many existing programs operable on the new computer. This is often accomplished by developing compiler means which decode instructions originating as source code and output program object modules having the complete sequence of instructions in object code necessary to run the desired program on the selected computer. The object module instruction must be executable on the selected computer and in addition, these instructions must be arranged in a format which is readable or loadable into the selected computer.

When a new computer first hits the marketplace, there is often an immediate demand to make literally hundreds of existing programs available on this new computer. Thus, in developing compilers to make these existing programs available on the new computer, it is often most expedient to use an existing compiler for the particular program which has been developed for an already existing computer having functional characteristics close to the new computer and then making a minimum number of changes in the compiler necessary to change the existing compiler into one that will generate a program object module executable on the new computer. In order for the object module to be executable on this new computer, the instructions in the object module must be individually executable on the computer and the instructions must be arranged in a format which is readable by or loadable into the new computer.

In situations where there is an already existing computer which accepts and handles program object modules having instructions arranged in the same format as the instruction arrangement format required by the new computer, and there is an available compiler for the desired program for this existing computer, it is usually a relatively easy task to change the compiler so as to have it now generate the desired program object module for the new computer. However, there are a great many program compilers for a wide variety of programs for existing computers which compilers are only capable of producing object modules with instructions having format quite different from the formats which may be required in order to be readable or loadable into the selected newly developed computers. This appears to be particularly the case when there is a demand for programs originally developed for the existing IBM System 370.

The IBM System 370 required program object modules in which the instructions are arranged in a general format which may be considered as unorganized in relation to the functions to be performed by the instructions in the format. The general format of IBM S370 object modules or files is described in the manual "S370 OS/VS Linkage Editor Logic" (SY26-38-15-) Second Edition, March 1980, published by IBM Corporation. The reason that the program files for S370 had such relatively unorganized instruction format arrangement was that a great deal of this programming came out of the older punched card deck technology. Thus, the still existing term "object deck" is still used for such program object modules.

On the other hand, the newer computers of recent years and particularly in the personal computer area generally require program object modules wherein the instructions are arranged in a format having a plurality of sections and each of the sections contains instructions performing a related function in the program of the object module. Typical of such an object module is the IBM RT PC AIX a.out object file or module described in Chapter 4 of "IBM RT PC Advanced Interactive Executive Operating System AIX Operating System Technical Reference Manual", First Edition, published November, 1985 by IBM Corporation.

Because the instruction formats in the object modules required by the newer personal computers of the type described are completely different from the format of instructions in the object modules of existing S370 programming, the conventional approach would be to develop a new compiler for each of the source programs for S370 which are desired to be used on new personal computers entering the marketplace. This can be, of course, relatively time consuming and quite costly.

SUMMARY OF THE INVENTION

The present invention involves the recognition that it is possible to avoid developing a completely new compiler for an existing program to be executed on a new machine even though the format of the instructions in the object module required in order to be loadable into the new computer is completely different from the format of the instruction in the object module producible by the existing compilers.

The present invention involves a system for generating a program object module for a selected computing system from a program source which comprises means for compiling an object module from said program source, said object module having instructions which are individually executable in said computing system but arranged in a first format which is not loadable into the computing system. Further, means are provided for converting said first instruction format into a second format which is loadable into said computing system.

In other words, the compiling means which may be an existing compiler is modified slightly so as to produce an object module having instruction for said new computing system i.e. individually executable by said computing system, but arranged in a format which is not loadable or readable into the new computing system. Then in combination, means are provided for converting first instruction format which is not loadable into the new computing system into a second format which is loadable into the new computing system. Thus, since the instructions generated are readable into and executable on the new computer, once the format has been changed, the instructions will now be arranged in a format which is executable on the new computing system.

The present invention is particularly advantageous when used to generate program object modules for newer computer systems which object modules have their instructions arranged in a format having a plurality of sections each of which contains instructions performing a related function in the program of the object module. With the present invention, such program modules of organized instructions can be generated through the use of compilers which produce object modules having generally unorganized instructions as in the previously described System 370 object modules. In accordance with the present invention, specific means may be provided for compiling an object module from a source program which object module has instructions which individually are executable in a selected computer but which instructions are arranged in a first format having an order unrelated to the function of the instructions in the program of the object module. In this case, because the selected computer is one which cannot handle instructions in such an unrelated format, the resulting object module is not loadable into the selected computer. Further means are now provided for converting this first and unrelated instruction format into a second format wherein the instructions are arranged in a plurality of sections each of which contain instructions performing a related function in the program of the object module. Instructions arranged in such an organized format are loadable into the selected computer. Thus, the result is an object module for the selected new computer.

With the system thus described, currently available compilers for a wide variety of programs which are capable of producing object modules wherein the instructions are in a format unrelated to function may still be useful. In this case, a relatively minor modification in the compiler may be made so as to generate appropriate individual instructions for the selected computer but having a format because of its arrangement unrelated to program function is not loadable into the selected computer. Then means are provided for converting just the format into one wherein instructions are organized in sections according to function and which is thus loadable into the selected computer.

The result is that a wide variety of older programs and compilers generated for the System 370, for example, may be used in the combination of the present invention to produce object modules for some of the newer personal computers.

Perhaps an even more significant aspect of the present invention is that once means for converting a first instruction format e.g. the previously described format unrelated to function, into a second format loadable into the selected computing system e.g. a format wherein the instructions are arranged in a plurality of sections with each containing instructions performing a related function in the program, then the same conversion means may be used to convert a wide variety of object modules having said first format into object modules having second format.

BRIEF DESCRIPTION OF THE DRAWING

Referring now to the drawings, wherein a preferred embodiment of the invention is illustrated, and wherein like reference numerals are used throughout to designate like parts;

FIG. 1 is a flow chart of the operations involved in proceeding from a source program through a compiler program to produce a program object module having a first format.

FIG. 2 is a flow chart of the operations involved in the procedure of FIG. 1 detailing how the compiler program of FIG. 1 tailors the instructions output in the object module so that these individual instructions are executable on selected or target machine.

FIG. 3 is a flow chart showing in a very generalized form the conversion of a program object module having a first format into a program object module having the second format.

BEST MODE FOR CARRYING OUT THE INVENTION

Figure 4:
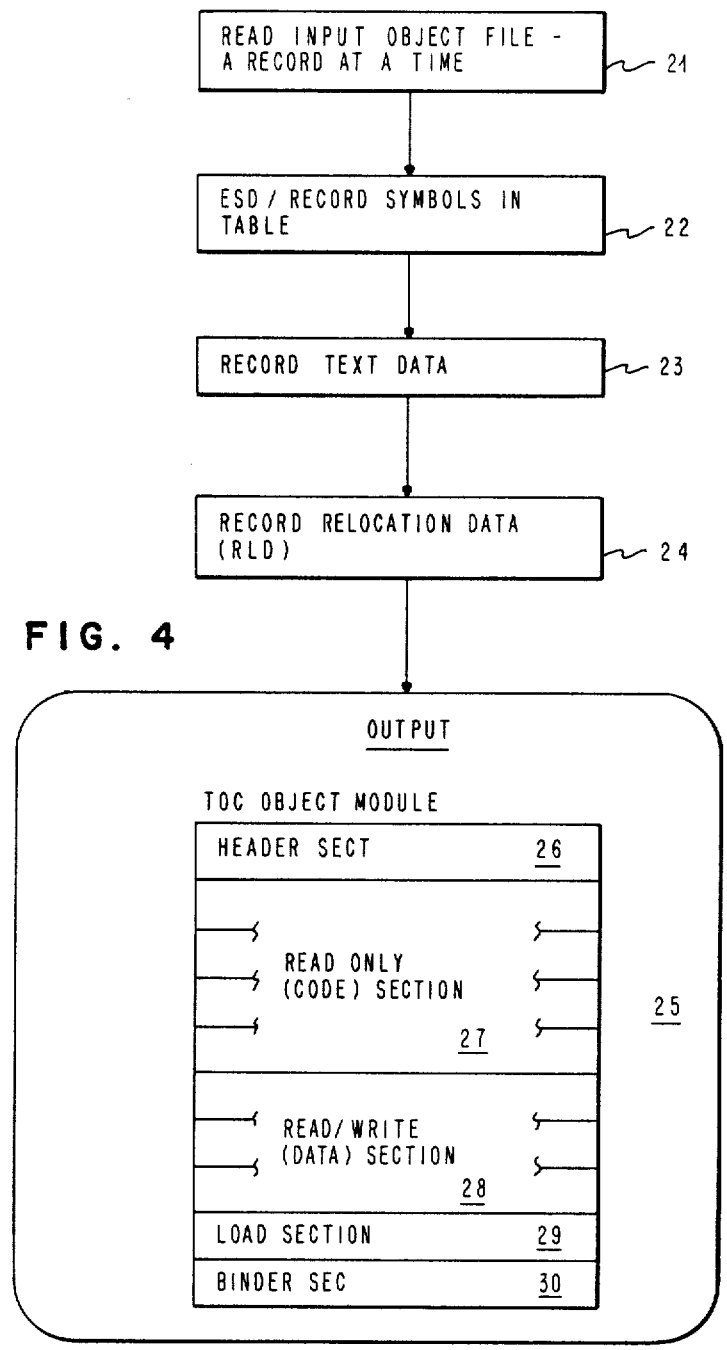
FIG. 4 is a flow chart of the operations involved during the conversion step of FIG. 3 in going through a first leg of conversion from program object module having the first format into a program object module having the TOC "Table of Contents" format.

In the specific embodiment of the present invention, the source program utilized was PL.8 developed by IBM Corporation. This program is well known in the art and its components as well as the components of a typical compiler ar described for example in the "IBM Journal of Research and Development", Vol. 27, No. 3, May, 1983, pages 237 through 246 and particularly starting page 241. The program PL.8 has been extensively used on the IBM System 370. In connection with the program, the PL.8 compiler for System 370 produces instructions arranged in a general format which may be considered as unorganized in relation to the functions to be performed by the instructions in the format. The general format of object modules or files thus produced is generally described hereinabove in connection with "S370 OS/VS Linkage Editor Logic" (SY26-38-15-) Second Edition, March 1980, published by IBM Corporation.

With reference to FIG. 1, let us assume commencing with a PL.8 source program, step 10, in the flow chart. In step 11, the source program is processed by a syntax analyzer which reads the input representing the user's program and checks for correct program statement syntax. Next, step 12, the compiler generates internal pseudocode which is an intermediate representation of the source program. Next, step 13, the pseudocode is optimized so that faster running machine code will result. At this point, steps branch to entry "A" in FIG. 2.

To elaborate on what takes place in the next two steps, let us assume that the present compiler is formed by modifying an existing compiler which was developed to generate a program object module of the PL.8 program for the previously described System 370 computer as the target. In the present embodiment, this original compiler is modified to provide a program object module of instructions that are executable on the target computer which is an IBM RT PC with an AIX operating system previously referenced as being described in Chapter 4 of "IBM RT PC Advanced Interactive Executive Operating System AIX Operating System Technical Reference Manual", First Edition, published November, 1985 by IBM Corporation. Accordingly, the table of executable instructions and pseudocode transformation algorithms will be the main modifications in the existing PL.8 compiler for the System 370. The modification will involve a new table of executable instructions and generally minor revisions to the pseudocode transformation algorithms to produce executable instructions for the IBM RT PC.

In step 14, the correct instruction opcode table is selected for transforming the pseudocode into machine instructions which are executable on the target computer.

Next, step 15, the pseudocode is transformed into corresponding executable instructions for the described IBM RT PC through the use of the above selected instruction opcode table. As a result, the output is, step 16, a module of instructions to carry out the PL.8 program which instructions are executable on the described IBM RT PC. These executable instructions make up the resulting program object module, step 17, FIG. 1. This module has a first format in which the instructions while individually executable on the described IBM RT PC are arranged in a first format which is essentially unorganized in relation to the functions performed by the instructions in the format. The instructions thus arranged cannot be handled by the described IBM RT PC which requires the instructions to be arranged in a format having a plurality of sections and each of the sections containing instructions performing a related function in the program for the instructions to be readable or loadable into the IBM RT PC. Thus, in its broadest sense according to the present invention, FIG. 3, the program object module having the first format is input 18 to an object module format converter 19 which converts the format of the instruction to an arrangement having a plurality of sections with each of the sections containing instructions performing a related function in the program. This object module output, step 20, having this second or organized format is handleable i.e., loadable or readable into the above described IBM RT PC having the AIX operating system. Since, as previously mentioned, the individual instructions are already executable on the RT PC AIX system, we thus have generated the requisite program object module.

We will now describe in greater detail step 19 of FIG. 3 which involves the conversion of the object module format from the relatively unorganized format described above to the organized format required by the IBM RT PC AIX system. For purposes of understanding the present invention, it should be recognized that a direct conversion could be made from the first format required by System 370 to the second organized format required by the IBM RT PC AIX. However, in the present embodiment for purposes of expediency, the transformation or conversion went through two stages. The first stage involved transforming the above described unorganized System 370 object format to an organized format known as the "Table of Contents" (TOC) object module format. This TOC module format is an existing format described in the IBM publication "Virtual Resource Manager Technical Reference for the IBM RT PC", First Edition (November, 1985), Appendix B. Then as will be hereinafter described, the object module, the format of which has been converted to the TOC format is then taken through a second conversion step wherein the format is converted to the above referenced format required by the IBM RT PC AIX system. The reason for this two stage conversion was that a mechanism for conversion of the System 370 object module format into the TOC object module format wherein the instructions are arranged in a format with sections each containing instructions performing a related function in the program of the object module had already been developed. It was accordingly considered much simpler to then further convert from the organized TOC object module format into the desired IBM RT PC AIX object module format which is known as "a.out".

With reference to FIG. 4, there will be described a conversion of a program object module having the first relatively unorganized format into a module having the above described TOC format wherein the instructions are arranged in a plurality of sections, each of the sections containing instructions performing a related function in the program of the object module.

Steps 21 through 24 are repeated until all records have been read and processed.

Step 21, the instructions in the object module are read, one record at a time. Then, step 22 ESD, if there is a symbol record, the symbols in the symbol dictionary are recorded in a table in a procedure which involves adding symbols to the symbol table and then allocating sufficient sections in storage to contain the text or code represented by the symbols. Next, step 23, text data is recorded. This involves placing the code or text for a symbol entry into the storage sections allocated above. Then, step 24, the RLD or record relocation data is added to a relocation table and the referenced code or text is adjusted by the appropriate relocation address. For an elaboration of how this relocation entry is made, reference is made to the above described "Virtual Resource Manager Technical Reference", Appendix B, commencing with page B6. Essentially, the relocation addresses are adjusted responsive to the quantity of text recorded in step 23.

Once all the records have been read and processed, then a TOC object module organized in a sectioned format is output in step 25. This format which is described in detail in the above listed "Virtual Resource Manager Technical Reference", comprises a header section 26 containing information required to run the object module, followed by a read-only section 27 consisting of executable object code and constants, followed by a read-write section 28 consisting of the read-write data of the module, followed by a loader section 29 which contains the symbol (ESD) and relocation (RLD) information required by a relocating loader, followed by a binder section 30 which contains all the symbol (ESD) and all the relocation (RLD) information for the module which is all the information required by a binder to bind this TOC object module with another TOC object module. The format of the binder section is the same as the format of the loader section.

The resulting TOC object module generated as described hereinabove will have the instructions which are individually executable on the IBM RT PC-AIX system arranged in a format in which the instructions are ordered in a plurality of sections with each section containing instructions performing a related function in the program. While the TOC program object module could be capable of being loadable or readable into a given computer system, in the present embodiment, the target computer, the IBM RT PC requires that the instructions be arranged in an a.out format. Previously referenced as being described in detail in Chapter 4 of "IBM RT PC Advanced Interactive Executive Operating System AIX Operating System Technical Reference Manual".

Figure 5:
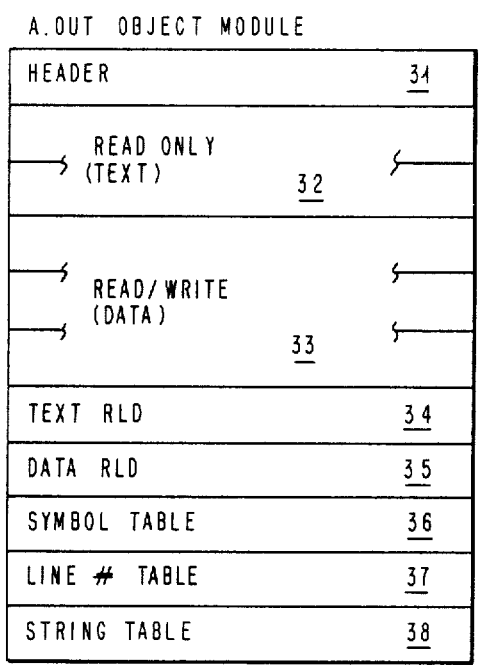
FIG. 5 is a representation of a typical a.out object module format showing the arrangement of instructions in sections each related to the function of the instructions in the program.

Because the a.out format like the TOC format is one wherein the instructions are arranged in a series of sections according to instruction function in the program, conversion from the TOC format to the a.out format is a relatively simple one. The a.out module format is shown in FIG. 5. The format of the a.out module in FIG. 5 contains a header section 31, sections of read-only code 32 called text, sections of read-write data 33 called data, a text relocate section 34 and a data relocate section 35, a symbol table section 36, a line number table section 37 and a string table section 38. All of the above are described in detail in Chapter 4 of the previously referenced "IBM RT PC Advanced Interactive Executive Operating System AIX Operating System Technical Reference Manual". Conversion from an a.out module format to a TOC module format is already known in the art. Please refer to the IBM Technical Disclosure Bulletin, Vol. 29, No. 2, July, 1986, pages 880-881.

Figure 6:
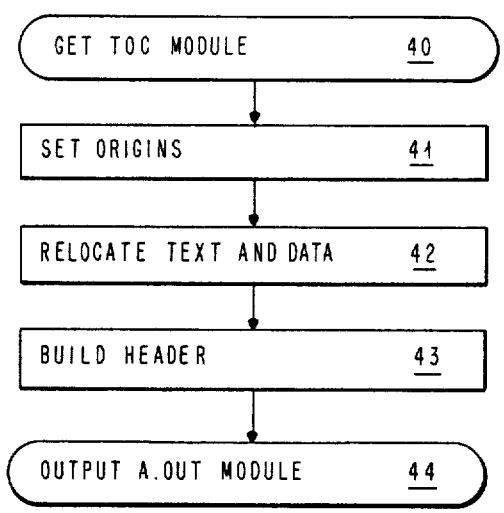
FIG. 6 is a flow chart of the operations involved in the conversion of a TOC object module to the a.out object module required by the IBM RT PC in the illustrative preferred embodiment of the present invention.

Now with respect to FIG. 6, there will be described the conversion of a TOC object module shown in FIG. 4 to an a.out object module shown in FIG. 5. First, step 40, the TOC object file module is read. Next, step 41, the origin addresses (absolute load addresses) are set for both the text section and the data section. Next, step 42, both the text (code) and the data are relocated by the amounts specified in the above origins. During this relocate step, the relocation (RLD), symbol table, optional line number table, and string table of the a.out module are built. Next, step 43, the a.out header is generated by filling in the length information for the subsequent a.out module sections which were built in the previous step.

At this point, step 44, the elements of the a.out object file generated in the above steps are output to th a.out object module file in the format described in FIG. 5 and the conversion is complete.

While the invention has been particularly shown and described with reference to a preferred embodiment it will be understood by those skilled in the art that various other changes in form and detail may be made without departing from the spirit and scope of the invention.

We claim:

1. A system for generating a program object module for a selected computing system from a program source comprising:
  means for compiling an object module from said program source, said object module having instructions for said computing system arranged in a first format not loadable into said computing system, and
  means for converting said arrangement of instructions from said first instruction format into a second format loadable into said computing system.

2. The system of claim 1 wherein the instructions in said second format are arranged in a plurality of sections, each of said sections containing instructions performing a related function in said object module.

3. The system of claim 2 wherein the instructions in said first format are arranged in an order unrelated to the function of said instructions in said object module.

4. A system for generating a plurality of different program object modules for a selected computing system from a corresponding plurality of different program sources comprising:
  means for compiling a plurality of different program object modules from said program sources, said object modules each having instructions for said computing system arranged in a first format not loadable into said computing system, and
  means for converting said arrangement of instructions from said first instruction format into a second format loadable into said computing system.

5. The system of claim 4 wherein the instructions in said second format are arranged in a plurality of sections, each of said sections containing instructions performing a related function in each respective object module.

6. The system of claim 5 wherein the instructions in said first format are arranged in an order unrelated to the function of said instructions in each respective object module.

7. A method for generating program object module for a selected computing system from a program source comprising steps performed by a computer of
  compiling an object module from said program source, said object module having instructions for said computing system arranged in a first format not loadable into said computing system, and
  converting said arrangement of instructions from said first instruction format into a second format loadable into said computing system.

8. The method of claim 7 wherein the instructions in said second format are arranged in a plurality of sections, each of said sections containing instructions performing a related function in said object module.

9. The method of claim 8 wherein the instructions in said first format are arranged in an order unrelated to the function of said instructions in said object module.

10. A method for generating a plurality of different program object modules for a selected computing system from a corresponding plurality of different program sources comprising steps performed by a computer of
  compiling a plurality of different program object modules from said program sources, said object modules each having instructions for said computing system arranged in a first format not loadable into said computing system, and
  converting said arrangement of instructions from said first instruction format into a second format loadable into said computing system.

11. The method of claim 10 wherein the instructions in said second format are arranged in a plurality of sections, each of said sections containing instructions performing a related function in each respective object module.

12. The method of claim 11 wherein the instructions in said first format are arranged in an order unrelated to the function of said instructions in each respective object module.

* * * * *